United States Patent
Lin et al.

(10) Patent No.: US 11,287,867 B2
(45) Date of Patent: Mar. 29, 2022

(54) POWER SEQUENCE MONITORING SYSTEM

(71) Applicant: LANNER ELECTRONICS INC., New Taipei (TW)

(72) Inventors: Pu-Sung Lin, New Taipei (TW); Tseng-Hua Tung, Taipei (TW); Yi-Hsien Liu, New Taipei (TW); Chien-Hsun Lin, New Taipei (TW); Chang-Ting Liu, Taipei (TW)

(73) Assignee: LANNER ELECTRONICS INC., New Taipei (TW)

( * ) Notice: Subject to any disclaimer, the term of this patent is extended or adjusted under 35 U.S.C. 154(b) by 0 days.

(21) Appl. No.: 16/893,442

(22) Filed: Jun. 5, 2020

(65) Prior Publication Data

US 2021/0173464 A1 Jun. 10, 2021

(30) Foreign Application Priority Data

Dec. 6, 2019 (TW) .................................. 108144812

(51) Int. Cl.
*G06F 1/28* (2006.01)
*G06F 13/40* (2006.01)
*G06F 1/24* (2006.01)

(52) U.S. Cl.
CPC .................. *G06F 1/28* (2013.01); *G06F 1/24* (2013.01); *G06F 13/4068* (2013.01)

(58) Field of Classification Search
CPC ... G06F 1/329; G06F 1/24; G06F 1/26; G06F 1/3296; G06F 1/3212; G06F 1/3203; G06F 1/28; G06F 13/40; G06F 1/3209
See application file for complete search history.

(56) References Cited

U.S. PATENT DOCUMENTS

| 6,333,650 B1* | 12/2001 | Amin | G06F 1/26 327/143 |
|---|---|---|---|
| 7,337,342 B1* | 2/2008 | O'Brien | G06F 1/26 713/300 |
| 2004/0160793 A1* | 8/2004 | Miermans | H02M 1/36 363/65 |
| 2008/0168290 A1* | 7/2008 | Jobs | G06F 3/04883 713/324 |
| 2009/0231342 A1* | 9/2009 | Smith | G06T 11/001 345/440 |
| 2012/0137159 A1* | 5/2012 | Chin | G06F 1/26 713/340 |
| 2014/0001852 A1* | 1/2014 | Bai | G05F 1/66 307/38 |
| 2014/0139528 A1* | 5/2014 | Naef | G06T 11/206 345/440 |

(Continued)

*Primary Examiner* — Raymond N Phan

(57) ABSTRACT

A power sequence monitoring system is disclosed, and comprises: a microprocessor and a control module. The microprocessor comprises a first conversion unit and a second conversion unit. The first conversion unit is used for converting a power-on signal received from a power management chip to a first digital signal, and the second conversion unit is adopted for converting a power-off signal received form the power management chip to a second digital signal. After receiving the first digital signal and the second digital signal from the microprocessor, and the control module outputs a plurality of power monitoring data to an electronic device, such that a user easily knows the power signal state of the host computer by the system of the present invention.

9 Claims, 5 Drawing Sheets

(56) References Cited

U.S. PATENT DOCUMENTS

| | | | |
|---|---|---|---|
| 2015/0137990 A1* | 5/2015 | Riche | G01D 4/002 |
| | | | 340/870.03 |
| 2017/0060204 A1* | 3/2017 | Gangwar | G06F 1/26 |
| 2017/0084246 A1* | 3/2017 | Joshi | G09G 5/00 |
| 2017/0336841 A1* | 11/2017 | Ragupathi | G06F 9/4411 |
| 2019/0104473 A1* | 4/2019 | Chun | H02J 7/00034 |
| 2020/0092118 A1* | 3/2020 | Zhuang | G06F 1/3203 |

* cited by examiner monitoring data

POWER ON platform
BMC_SYS_MON_PWR_GOOD = 1
CPLD Read Addr=0x20-0x21, Data=69
CPLD Read Addr=0x22-0x23, Data=69
CPLD Read Addr=0x24-0x25, Data=20490
CPLD Read Addr=0x26-0x27, Data=20490
CPLD Read Addr=0x28-0x29, Data=26176
CPLD Read Addr=0x2a-0x2b, Data=1586
CPLD Read Addr=0x2c-0x2d, Data=61891
CPLD Read Addr=0x2e-0x2f, Data=77
CPLD Read Addr=0x30-0x31, Data=77
CPLD Read Addr=0x32-0x33, Data=98
CPLD Read Addr=0x34-0x35, Data=98
CPLD Read Addr=0x36-0x37, Data=540
CPLD Read Addr=0x38-0x39, Data=520
CPLD Read Addr=0x3a-0x3b, Data=1416
CPLD Read Addr=0x3c-0x3d, Data=8644
CPLD Read Addr=0x3e-0x3f, Data=2055
CPLD Read Addr=0x40-0x41, Data=2049
CPLD Read Addr=0x42-0x43, Data=7306
CPLD Read Addr=0x44-0x45, Data=8644 power sequence waveform

| Address | Power cable insertion | |
|---|---|---|
| | | 0us |
| 20/21 | VDD_33DUAL_PG | 690us |
| 22/23 | BMC_ASSERT_BMC_READY | 690us |
| 24/25 | P0_VDD_18_DUAL_PG | 204.90ms |
| 20/21 | P0_VDDCR_SOC_DUAL_PG | 204.90ms |
| 28/29 | P0_RSMRST_L | 261.76 |
| PWR_BTN | P0_PWR_BTN_L_ | 0ms |
| 2A/2B | P0_SLP_S3_L | 15.86ms |
| 2C/2D | ATXPWGD | 618.91ms |
| 2E/2F | P0_VDD_VPP_ABCD_PG | 0.77ms |
| 30/31 | P0_VDD_VPP_EFGH_PG | 0.77ms |
| 32/33 | P0_VDDIO_MEM_ABCD_PG | 0.98ms |
| 34/35 | P0_VDDIO_MEM_EFGH_PG | 0.98ms |
| 36/37 | P0_VDD_VTT_ABCD_SUS_PG | 5.40ms |
| 38/39 | P0_VDD_VTT_EFGH_SUS_PG | 5.20ms |
| 3A/3B | P0_VDD_18_RUN_PG | 14.16ms |
| 3E/3F | P0_VDDCR_SOC_RUN_PG | 20.55ms |
| 40/41 | P0_VDDCR_CPU_RUN_PG | 20.49ms |
| 42/43 | P0_PWR_GOOD | 73.06ms |
| 44/45 | P0_PWRGD_OUT | 86.44ms |
| 3C/3D | P0_33_PWROK | 86.44ms |

FIG. 4

POWER SEQUENCE MONITORING SYSTEM

BACKGROUND OF THE INVENTION

1. Field of the Invention

The present invention relates to the technology field of power signal sequence, and more particularly to a power sequence monitoring system.

2. Description of the Prior Art

Along with the diversified development of electronic products, monitoring for a power-on/off sequence of the electronic product becomes more and more important. For instance, in case of the fact that one or more of electronic components and/or chips of the electronic product are powered by current and/or voltage in an incorrect sequence, power system of the electronic product may lead to have a disordered operation state and/or transceiver complex electrical signals. On the other hand, when the power system supply a power with incorrect voltage level and/or current level to the electronic components and/or chips of the electronic product due to the disordered operation state and/or transceiving the complex electrical signals, there is a high risk to cause the electronic components and/or chips be damaged.

Accordingly, for providing more safe, economic, and durable electronic devices, it is essential to inspect and monitor amplitude and/or the sequence of a power signal from an electronic device. One of a power signal monitoring method is to use an oscilloscope or a multimeter to measure the amplitude and the sequence of the power signal, so as to detect the malfunction state of the power signal, such as disable to switch on/off or unstable velocity. However, the forgoing power signal monitoring method has the disadvantages of high labor cost and unable to measure each power sequence and waveform of the electronic product immediately. In addition, said current method is hardly to avoid human negligence, and also increase the probability of electric shock by the power system. On the other hand, after a host computer of the electronic product has been installed in a case, it is difficult to measure the power signal sequence of the electronic product by using oscilloscope or multimeter.

From above descriptions, it should know that there is room for improvement in the conventional power sequence monitoring method and device thereof. In view of that, inventors of the present application have made great efforts to make inventive research and eventually provided a power sequence monitoring system.

SUMMARY OF THE INVENTION

The primary objective of the present invention is to disclose a power sequence monitoring system, and comprises: a microprocessor and a control module. The microprocessor comprises a first conversion unit and a second conversion unit. The first conversion unit is used for converting a power-on signal received from a power management chip to a first digital signal. According to particular design of the present invention, the control module outputs a plurality of power monitoring data to an electronic device, such that a user easily knows the operation state of each power system by reading the power monitoring data shown on a screen of an electronic device.

In order to achieve the primary objective of the present invention, the inventor of the present invention provides an embodiment for the power sequence monitoring system, comprising:

an input voltage detecting unit, being coupled to an external power supply unit, used for sensing an input voltage provided by the power supply unit;

a microprocessor, being disposed on a main board of a host computer device, and being electrically connected to a power management chip that is arranged on the main board; wherein the microprocessor comprises:

a first conversion unit, being configured for receiving a power-on signal form the power management chip through a first signal transmitting channel, thereby converting the power-on signal to a first digital signal for digitalizing a number of occurrence times of the power-on signal; and a second conversion unit, being configured for receiving a power-off signal from the power management chip through a second signal transmitting channel, so as to convert the power-off signal to a second digital signal for digitalizing a number of occurrence times of the power-off signal; and a control module, being electrically connected to the microprocessor, so as to receive the first digital signal and the second digital signal from the microprocessor, and outputting a plurality of power monitoring data to an electronic device by using a communication unit thereof The embodiment of the power sequence monitoring system further comprises: a common bus, being electrically connected between the microprocessor and the control module;

wherein the microprocessor module transits the first digital signal and the second digital signal from a register thereof to a register of the control module through the common bus, and the control module decides at least one register address that is corresponding to the first digital signal and the second digital signal according to a system clock signal.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 4 shows a data schematic view of power monitoring data and power waveform;

DETAILED DESCRIPTION OF THE PREFERRED EMBODIMENTS

To more clearly describe a power sequence monitoring system according to the present invention, embodiments of the present invention will be described in detail with reference to the attached drawings hereinafter.

Figure 1:
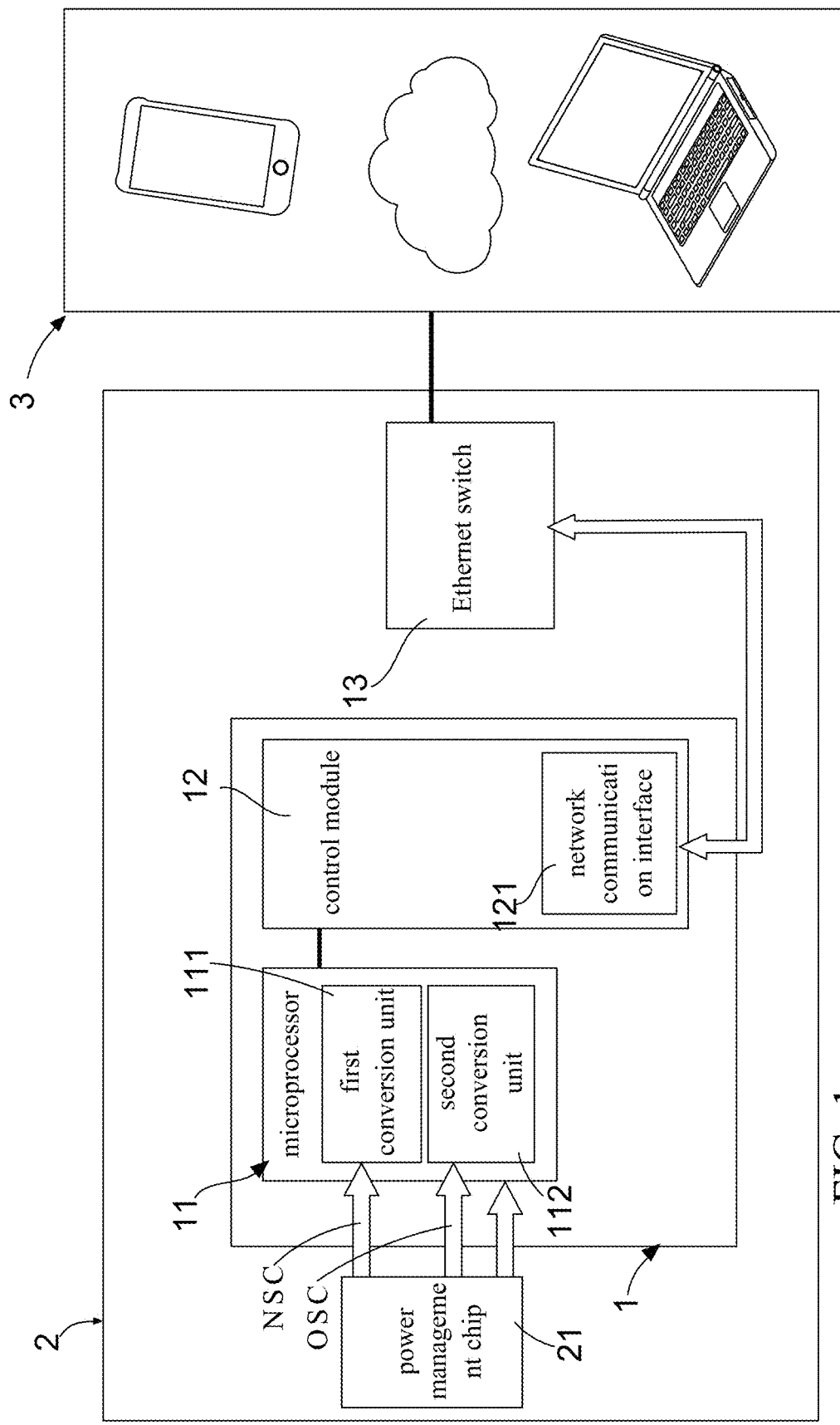
FIG. 1 shows a first block diagram of a power sequence monitoring system according to a present invention.
Figure 2:
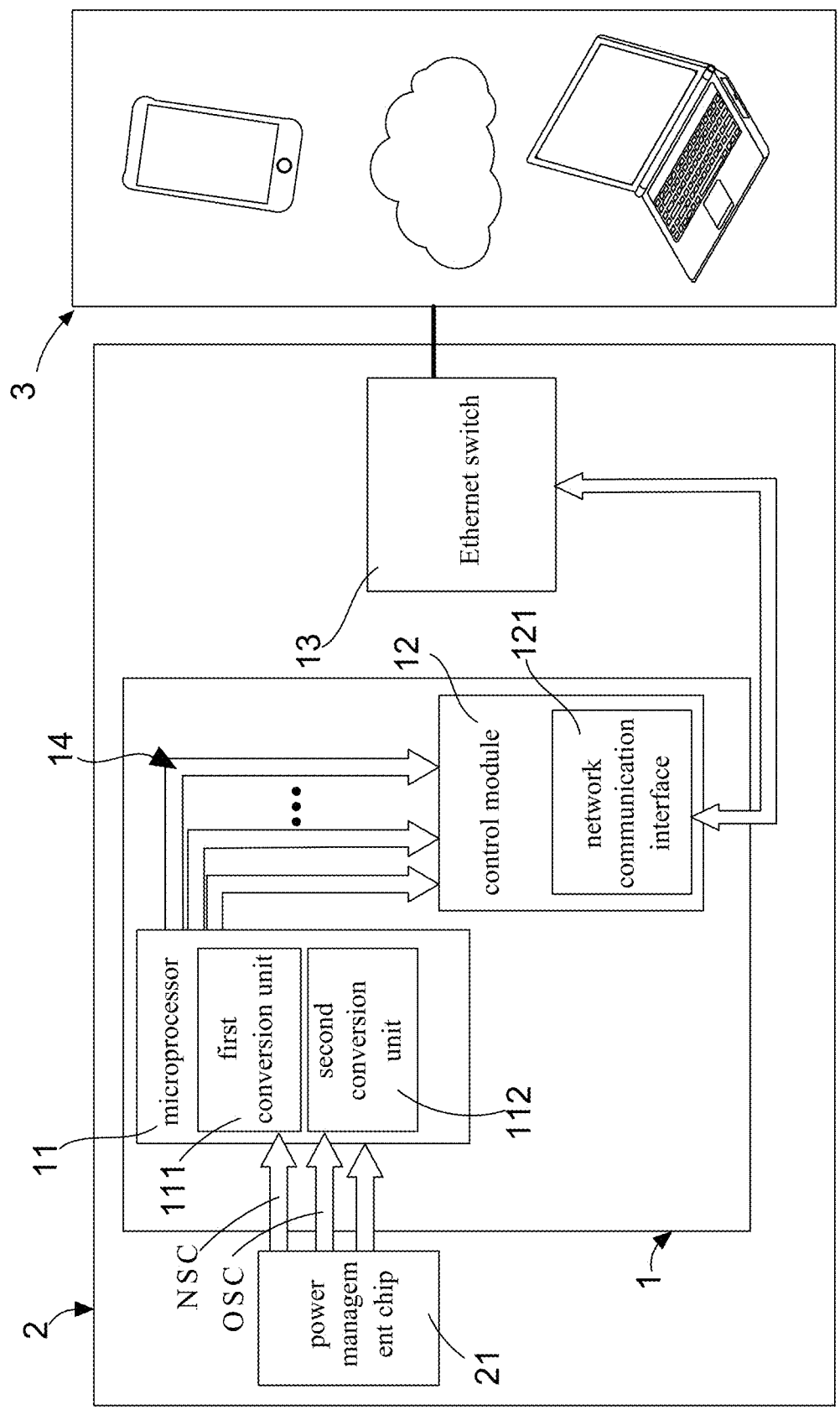
FIG. 2 shows a second block diagram of a power sequence monitoring system according to a present invention.

With reference to FIG. 1, there is provided a first block diagram of a power sequence monitoring system according to a present invention. And please simultaneously refer to FIG. 2, which shows a second block diagram of a power sequence monitoring system according to the present invention. As shown in FIG. 1 and FIG. 2, a power sequence monitoring system 1 of the present invention comprises a microprocessor 11 and a control module 12, wherein the microprocessor 11 is disposed on a main board 2 of a host computer, and electrically connected to a power management chip 21. Moreover, the microprocessor 11 comprises a first conversion unit 111 and a second conversion unit 112. As explained in more detail below, the first conversion unit 111 of the microprocessor 11 receives a power-on signal from the power management chip 21 through a first signal transmitting channel NSC, thereby converts the power-on signal to a first digital signal for digitalizing a number of occurrence times of the power-on signal. In the meantime, the second conversion unit 112 receives a power-off signal from the power management chip 21 through a second signal transmitting channel OSC, so that the second conversion unit 112 converts the power-off signal to a second digital signal for digitalizing a number of occurrence times of the power-off signal. The control module 12 is electrically connected to the microprocessor 11, in order to receive the first digital signal and the second digital signal from the microprocessor 11, and output a plurality of power monitoring data to an electronic device 3 by using a communication thereof.

Inheriting to above descriptions, the host computer is a network server, and the communication unit is a network communication interface 121 for connecting to an Ethernet switch 13 of the network server, such that the electronic device 3 is coupled to the control module 12 via the Ethernet switch 13 to receive the power monitoring data. In addition, the communication unit comprises a wired communication interface and/or a wireless communication interface, and the electronic device 3 is selected from the group consisting of cloud server, desk computer, laptop computer, and smart phone. Moreover, the microprocessor 11 is a field programmable gate array (FPGA) or a complex programmable logic device (CPLD). In this embodiment, the microprocessor 11 is the CPLD. More particularly, the first conversion unit 111 is provided in the microprocessor 11 by a form of firmware, function library, application program, or operands. In a similar way, the second conversion unit 112 is provided in the microprocessor 11 by a form of firmware, function library, application program, or operands. It is worth noting that, the first conversion unit 111 can be considered to be a power-on to digital converter (PN2D) according to its functionality. Likewise, the second conversion unit 112 can be considered to be a power-off to digital converter (PO2D) according to its functionality.

Figure 3:
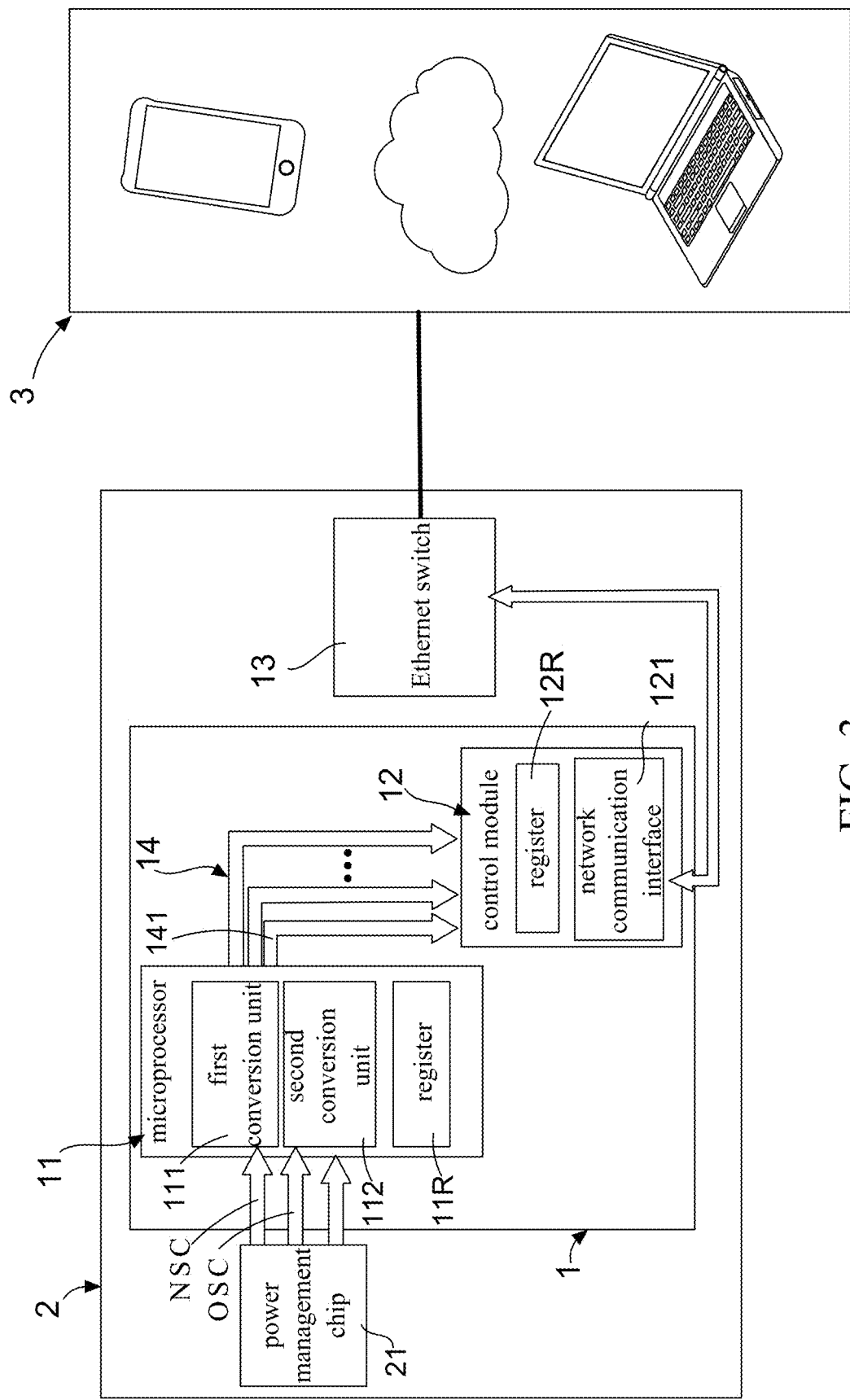
FIG. 3 shows a third block diagram of a power sequence monitoring system according to a present invention.

Continuously referring to FIG. 2, and please simultaneously refer to FIG. 3, which shows a third block diagram of a power sequence monitoring system according to the present invention. As FIG. 3 shows, the system of the present invention further comprises a common bus that is electrically connected between the microprocessor 11 and the control module 12. Wherein the microprocessor 11 transmits the first digital signal and the second digital signal from a register 11R thereof to a register 12R of the control module 12 through a first channel 141 of the common bus 14. Moreover, the control module 12 decides at least one register address that is corresponding to the first digital signal and the second digital signal according to a system clock signal. Please refer to FIG. 4, there is provided a data schematic view of power monitoring data and power waveform. Examples of the monitoring data are shown on left-hand side of the FIG. 4. As shown in right-hand side of the FIG. 4, a plurality of power sequence waveform be shown on a screen of a display device or the electronic device 3 coupled to the control module 12 via the Ethernet switch 13. More particularly, after receiving the power monitoring data, the electronic device 3 compares it with a reference signal for obtaining a comparison result that is showed on the screen. By such arrangement, a user easily knows that whether or not the power sequence waveform of the power on/off signal meet the predefined specification. Briefly speaking, the user easily monitors the power signal state of the host computer by the system 1 of the present invention. In addition, the user is capable of inspecting the power signal state and the comparison result of the host computer by connecting to the network communication interface 121 of the control module 12 after the power-on/off signal be generated.

Figure 5:
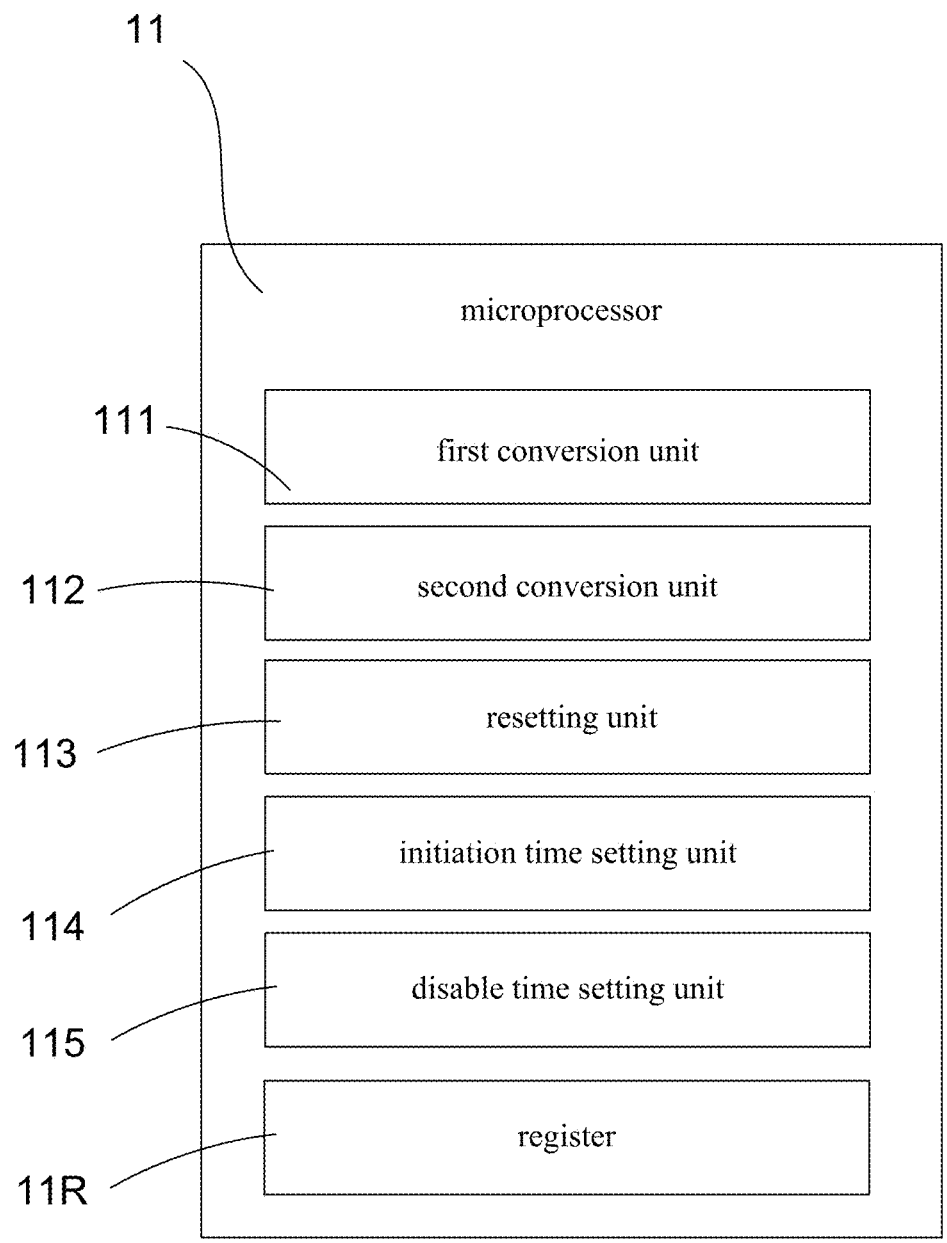
FIG. 5 shows a block diagram of a microprocessor.

Continuously referring to FIG. 3, and please simultaneously refer to FIG. 5, which shows a block diagram of a microprocessor. As FIG. 5 shows, the microprocessor 11 further comprises a resetting unit 113, an initiation time setting unit 114, and a disable time setting unit 115. According to particular design of the present invention, the microprocessor 11 receives the first digital signal and the second digital signal, and then resetting the first conversion unit 111 and/or the second conversion unit 112 by the resetting unit 114. Moreover, the initiation time setting unit 114 is configured for deciding an initiation time of the first conversion unit 111 and/or the second conversion unit 112, and the disable time setting unit 115 is configured for deciding a disable time of the first conversion unit 111 and/or the second conversion unit 112. As a result, the microprocessor 11 records the initiation time/the disable time, so as to correspondingly output the first digital signal and the second digital signal. Furthermore, the electronic device is a X86 electronic host computer.

Therefore, through above descriptions, the power sequence monitoring system proposed by the present invention have been introduced completely and clearly; in summary, the present invention includes the advantages of:

(1) Differing from the forgoing power signal monitoring method having the disadvantage of high labor cost, the present invention discloses a power sequence monitoring system 1 that is capable of recording easily a power-on/off signal of a host computer for monitoring the power signal state of the host computer. This system 1 comprises a microprocessor 11 and a control module 12. A first conversion unit 111 of the microprocessor 11 converting a power-on signal received from a power management chip 21 to generate a first digital signal. Moreover, a second conversion unit 112 of the microprocessor 11 converting a power-off signal received from the power management chip 21, so as to generate a second digital signal. The control module 12 receives the first digital signal and the second digital signal to output a plurality of power monitoring data. As a result, a user receives the power monitoring data from the control module 12 by an electronic device 3, such that the user easily knows the power signal state of the host computer immediately.

The above description is made on embodiments of the present invention. However, the embodiments are not intended to limit scope of the present invention, and all equivalent implementations or alterations within the spirit of the present invention still fall within the scope of the present invention.

What is claimed is:

1. A power sequence monitoring system, comprising:
a microprocessor, being disposed on a main board of a host computer, and being electrically connected to a power management chip that is arranged on the main board; wherein the microprocessor comprises:
   a first conversion unit, being provided in the microprocessor by a form of firmware, function library, application program, or operands so as to be configured for receiving a power-on signal from the power management chip through a first signal transmitting channel, thereby converting the power-on signal to a first digital signal for digitalizing a number of occurrence times of the power-on signal; and
   a second conversion unit, being provided in the microprocessor by a form of firmware, function library, application program, or operands so as to be configured for receiving a power-off signal from the power management chip through a second signal transmitting channel, so as to convert the power-off signal to a second digital signal for digitalizing a number of occurrence times of the power-off signal; and
a control module, being electrically connected to the microprocessor, so as to receive the first digital signal and the second digital signal from the microprocessor, and outputting a plurality of power monitoring data to an electronic device by using a communication unit thereof.

2. The power sequence monitoring system of claim 1, wherein the host computer is a network server, and the communication unit being a network communication interface for connecting to an Ethernet switch of the network server, such that the electronic device is coupled to the control module via the Ethernet switch.

3. The power sequence monitoring system of claim 1, wherein the communication unit comprises a wired communication interface and/or a wireless communication interface, and the electronic device being selected from the group consisting of cloud server, desk computer, laptop computer, and smart phone.

4. The power sequence monitoring system of claim 1, wherein the microprocessor is a field programmable gate array (FPGA) or a complex programmable logic device (CPLD).

5. The power sequence monitoring system of claim 1, wherein the control module is a baseboard management controller (BMC).

6. The power sequence monitoring system of claim 1, further comprising:
a common bus, being electrically connected between the microprocessor and the control module;
wherein the microprocessor transits the first digital signal and the second digital signal from a register thereof to a register of the control module through the common bus, and the control module decides at least one register address that is corresponding to the first digital signal and the second digital signal according to a system clock signal.

7. The power sequence monitoring system of claim 1, wherein the microprocessor comprises:
a resetting unit, being configured for resetting the first conversion unit and/or the second conversion unit;
an initiation time setting unit, being configured for deciding an initiation time of the first conversion unit and/or the second conversion unit; and
a disable time setting unit, being configured for deciding a disable time of the first conversion unit and/or the second conversion unit.

8. The power sequence monitoring system of claim 1, wherein the electronic device is a X86 electronic host computer.

9. The power sequence monitoring system of claim 2, wherein after receiving the plurality of power monitoring data, the electronic device compares the plurality of power monitoring data with a reference signal for obtaining a comparison result, and then making the comparison result be showed on a screen of a display device.

* * * * *